US012724223B2

(12) United States Patent
Hu et al.

(10) Patent No.: US 12,724,223 B2
(45) Date of Patent: Sep. 1, 2026

(54) OPTICAL MODULE

(71) Applicant: Qisda Corporation, Taoyuan City (TW)

(72) Inventors: Sheng-Wen Hu, Taoyuan City (TW); Hsin-Jung Yeh, Taoyuan City (TW)

(73) Assignee: Qisda Corporation, Taoyuan City (TW)

( * ) Notice: Subject to any disclaimer, the term of this patent is extended or adjusted under 35 U.S.C. 154(b) by 705 days.

(21) Appl. No.: 18/320,209

(22) Filed: May 19, 2023

(65) Prior Publication Data

US 2024/0134144 A1 Apr. 25, 2024
US 2024/0231035 A9 Jul. 11, 2024

(30) Foreign Application Priority Data

Oct. 19, 2022 (CN) ......................... 202211280441.2

(51) Int. Cl.
*G02B 7/02* (2021.01)

(52) U.S. Cl.
CPC ........ *G02B 7/023* (2013.01); *G02B 2207/117* (2013.01)

(58) Field of Classification Search
CPC .. G02B 7/023; G02B 2207/117; G03B 21/14; G03B 21/206; G03B 21/208
See application file for complete search history.

(56) References Cited

U.S. PATENT DOCUMENTS

2010/0135010 A1* 6/2010 Liu ...................... F21V 31/005 362/231
2011/0122503 A1* 5/2011 Lin ...................... G02B 7/023 359/808

FOREIGN PATENT DOCUMENTS

CN 209842318 12/2019
CN 212933214 4/2021

* cited by examiner

*Primary Examiner* — James C. Jones
(74) *Attorney, Agent, or Firm* — JCIPRNET

(57) ABSTRACT

An optical module includes a base, a holding component, an optical element, and at least one detachable structure. The holding component is disposed on the base, in which a position of the holding component relative to the base along a first axial direction is adjustable. The optical element is disposed on the holding component. The detachable structure is extended from one of the base and the holding component to face another one of the base and the holding component, so as to limit a position of the holding component relative to the base along a second axial direction.

11 Claims, 8 Drawing Sheets

OPTICAL MODULE

CROSS-REFERENCE TO RELATED APPLICATION

This application claims the priority benefit of China application serial no. 202211280441.2, filed on Oct. 19, 2022. The entirety of the above-mentioned patent application is hereby incorporated by reference herein and made a part of this specification.

BACKGROUND

Technical Field

The disclosure relates to an optical module, and in particular relates to an optical module capable of adjusting an optical path during an assembly process.

Description of Related Art

Each optical element in the projector is fixed by mechanical components, multiple mechanical components holding the optical elements are combined into a module, and multiple modules are combined into a complete optical system. The manufacturing and assembly tolerances of these mechanical components causes an optical path to shift and affect the optical performance. Therefore, some mechanical components in an optical engine system are designed to be adjustable, so that the optical path may be corrected by adjusting positions of the mechanical components during an assembly process, and then be fixed by glue dispensing or other appropriate methods.

As mentioned above, in some optical systems, the mechanical components are designed to be able to perform a one-dimensional adjustment on a single axial direction, but only performing the adjustment of the single axial direction may not be sufficient to adjust the optical path correctly. If the mechanical components are designed to be able to perform a two-dimensional adjustment along two axial directions, the above-mentioned problems may be solved, but in a case where only performing a single axial direction adjustment is sufficient, this design with high adjustment freedom causes that the adjustments between the mechanism components cannot be performed quickly and correctly.

SUMMARY

The disclosure provides an optical module, and the adjustment of a position of an optical element thereof can be performed quickly and correctly.

The optical module of the disclosure includes a base, a holding component, an optical element, and at least one detachable structure. The holding component is disposed on the base, in which a position of the holding component relative to the base along a first axial direction is adjustable. The optical element is disposed on the holding component. The detachable structure is extended from one of the base and the holding component to face another one of the base and the holding component, so as to limit a position of the holding component relative to the base along a second axial direction.

In an embodiment of the disclosure, the first axial direction is perpendicular to the second axial direction.

In an embodiment of the disclosure, the first axial direction and the second axial direction are perpendicular to an optical axis of the optical element.

In an embodiment of the disclosure, the base has two opposite inner walls, the holding component has two opposite lateral surfaces, the two lateral surfaces respectively face the two inner walls, and the at least one detachable structure is positioned between at least one of the inner walls and at least one of the lateral surfaces.

In an embodiment of the disclosure, the detachable structure is extended from the at least one inner wall to face the at least one lateral surface.

In an embodiment of the disclosure, the detachable structure is extended from the at least one lateral surface to face the at least one inner wall.

In an embodiment of the disclosure, a quantity of the detachable structures is multiple, a part of these detachable structures is positioned between a lateral surface and a corresponding inner wall, and another part of these detachable structures is positioned between another lateral surface and a corresponding inner wall.

In an embodiment of the disclosure, the detachable structure has a connecting part and a limiting part, the connecting part is connected between one of the base and the holding component and the limiting part, and the limiting part faces another one of the base and the holding component.

In an embodiment of the disclosure, an outer diameter of the connecting part is smaller than an outer diameter of the limiting part.

In an embodiment of the disclosure, the quantity of the detachable structures is multiple, and these detachable structures are connected sequentially along a direction from one of the base and the holding component to another one of the base and the holding component.

In an embodiment of the disclosure, the detachable structure is in a T-shaped form.

In an embodiment of the disclosure, an outer diameter of the detachable structure gradually increases from one of the base and the holding component to another one of the base and the holding component.

In an embodiment of the disclosure, the detachable structure is in an L-shaped form.

In an embodiment of the disclosure, the optical module further includes at least one gasket, in which the at least one gasket is detachably disposed between one of the base and the holding component and the at least one detachable structure.

Based on the above, in the optical module of the disclosure, the detachable structure is added to the holding component or the base to limit the position of the holding component along the second axial direction, so that the position of the holding component and the optical element held thereon may be quickly and correctly adjusted along the first axial direction during the assembly process. If it is found during the assembly process that only performing a one-dimensional adjustment of the holding component along a single axial direction (i.e., the first axial direction) is not sufficient to adjust the optical path correctly, then the detachable structure may be dismantled and a two-dimensional adjustment may be performed on the holding component along two axial directions (i.e., the first axial direction and the second axial direction), so as to correctly adjust the optical path. Accordingly, the optical module of the disclosure can quickly and correctly perform the adjustment of the position of the optical element in response to different adjustment needs.

DESCRIPTION OF THE EMBODIMENTS

Figure 1:
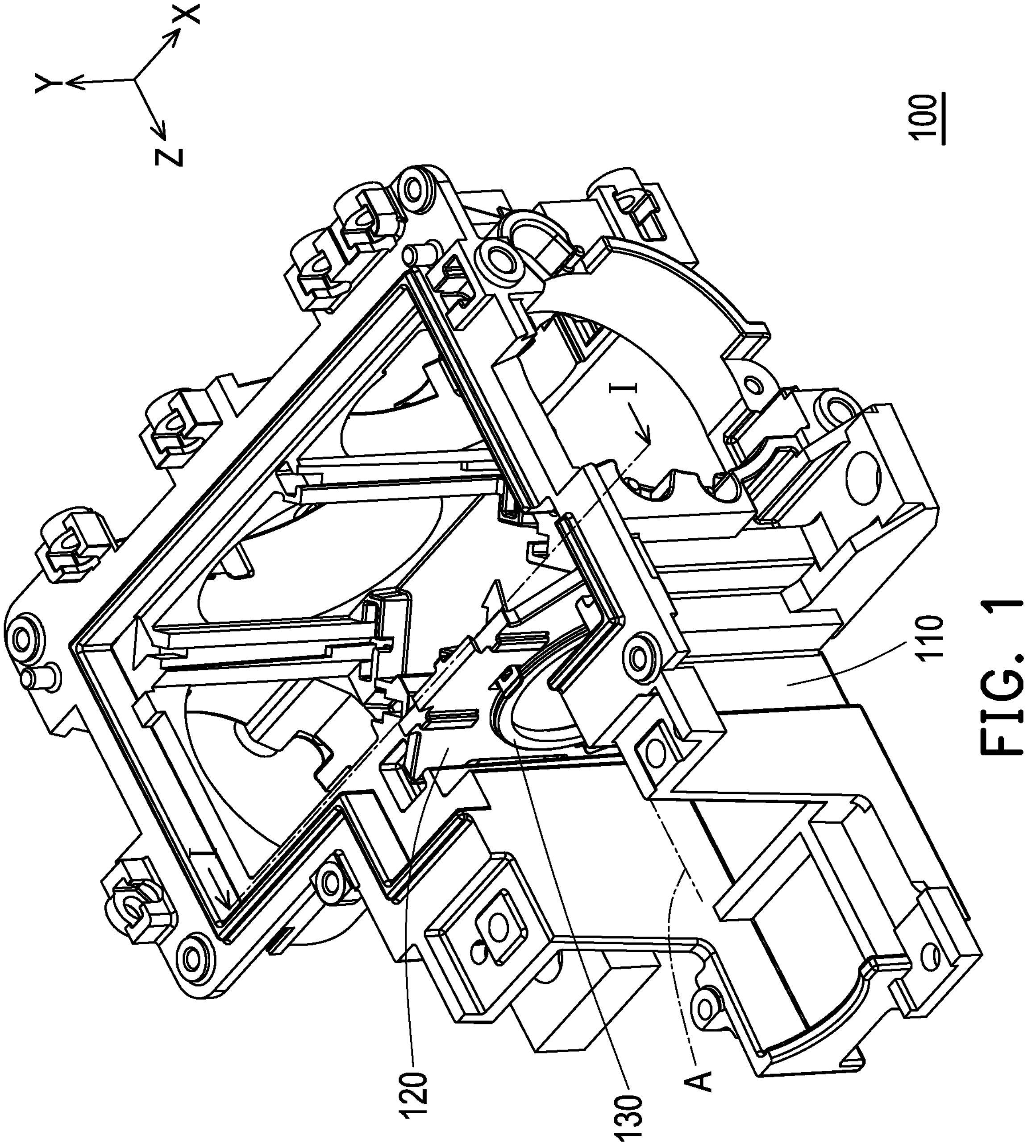
FIG. 1 is a perspective view of an optical module according to an embodiment of the disclosure.
Figure 2:
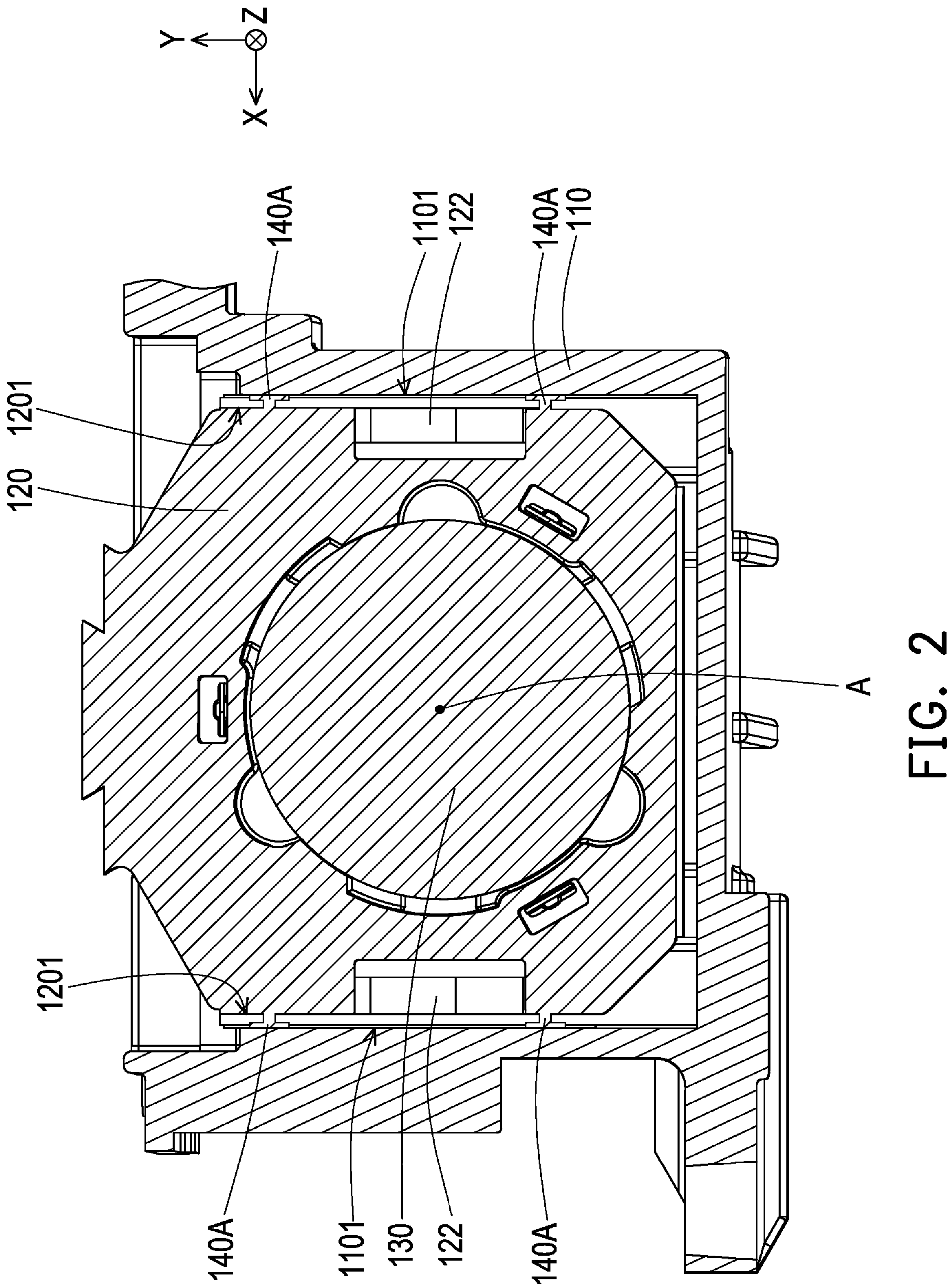
FIG. 2 is a cross-sectional view of the optical module in FIG. 1 along a line I-I.

FIG. 1 is a perspective view of an optical module according to an embodiment of the disclosure. FIG. 2 is a cross-sectional view of the optical module in FIG. 1 along a line I-I. Please refer to FIG. 1 and FIG. 2. An optical module 100 of this embodiment includes a base 110, a holding component 120, an optical element 130, and at least one detachable structure (illustrated as multiple detachable structures 140A in FIG. 2). The holding component 120 is disposed on the base 110, and a position of the holding component 120 relative to the base 110 along a first axial direction Y is adjustable. The optical element 130 is disposed on the holding component 120. These detachable structures 140A are extended from the holding component 120 to face the base 110, so as to limit a position of the holding component 120 relative to the base 110 along a second axial direction X.

As mentioned above, in this embodiment, the detachable structure 140A is added to the holding component 120 to limit the position of the holding component 120 along the second axial direction X, so that the holding component 120 and the optical element 130 held thereon may quickly and correctly adjust a position along the first axial direction Y during an assembly process. If a user finds that only performing a one-dimensional adjustment of the holding component 120 along a single axial direction (i.e., the first axial direction Y) is not sufficient to adjust an optical path correctly during the assembly process, then the detachable structure 140A may be dismantled and a two-dimensional adjustment may be performed on the holding component 120 along two axial directions (i.e., the first axial direction Y and the second axial direction X), so as to correctly adjust the optical path. Accordingly, the optical module 100 of this embodiment can quickly and correctly perform the adjustment of the position of the optical element 130 in response to different adjustment needs.

In this embodiment, the first axial direction Y is, for example, perpendicular to the second axial direction X, and the first axial direction Y and the second axial direction X are, for example, perpendicular to an optical axis A of the optical element 130. However, the disclosure is not limited thereto, and the first axial direction and the second axial direction may be two axial directions that are not perpendicular to each other, and may not be perpendicular to the optical axis A of the optical element 130.

During the adjustment process, for example, the holding component 120 abuts against the base 110 by an elastic piece 122 thereof, so as to maintain a position of the holding component 120 along a third axial direction Z, so that the adjustment is easy to be performed. After the adjustment is completed, the user may fix a position of the holding component 120 on the base 110 by glue dispensing or other appropriate methods.

In this embodiment, the optical module 100 is, for example, disposed in an optical engine system of a projector. More specifically, the optical module 100 is, for example, at least part of the components of the light-combining module, the base 110 thereof is adjacent to a light-emitting diode light source in the optical engine system, and the optical element 130 is, for example, a lens element. In other embodiments, the optical module 100 and the optical element 130 thereof may be in other forms, and the disclosure is not limited thereto.

Please refer to FIG. 2. In detail, the base 110 of this embodiment has two opposite inner walls 1101, the holding component 120 has two opposite lateral surfaces 1201, and the two lateral surfaces 1201 face the two inner walls 1101 respectively. Each detachable structure 140A is extended from the lateral surface 1201 of the holding component 120 and is positioned between the inner wall 1101 of the base 110 and the lateral surface 1201 of the holding component 120 and faces the inner wall 1101 of the base 110. Furthermore, the holding component 120 is provided with the detachable structures 140A on the two lateral surfaces 1201 thereof, a part of these detachable structures 140A (i.e., the two detachable structures 140A on the left side of the holding component 120 in FIG. 2) is positioned between a lateral surface 1201 of the component 120 and a corresponding inner wall 1101, and another part of these detachable structures 140A (i.e., the two detachable structures 140A on the right side of the holding component 120 in FIG. 2) is positioned between another lateral surface 1201 of the holding component 120 and a corresponding inner wall 1101.

Figure 3:
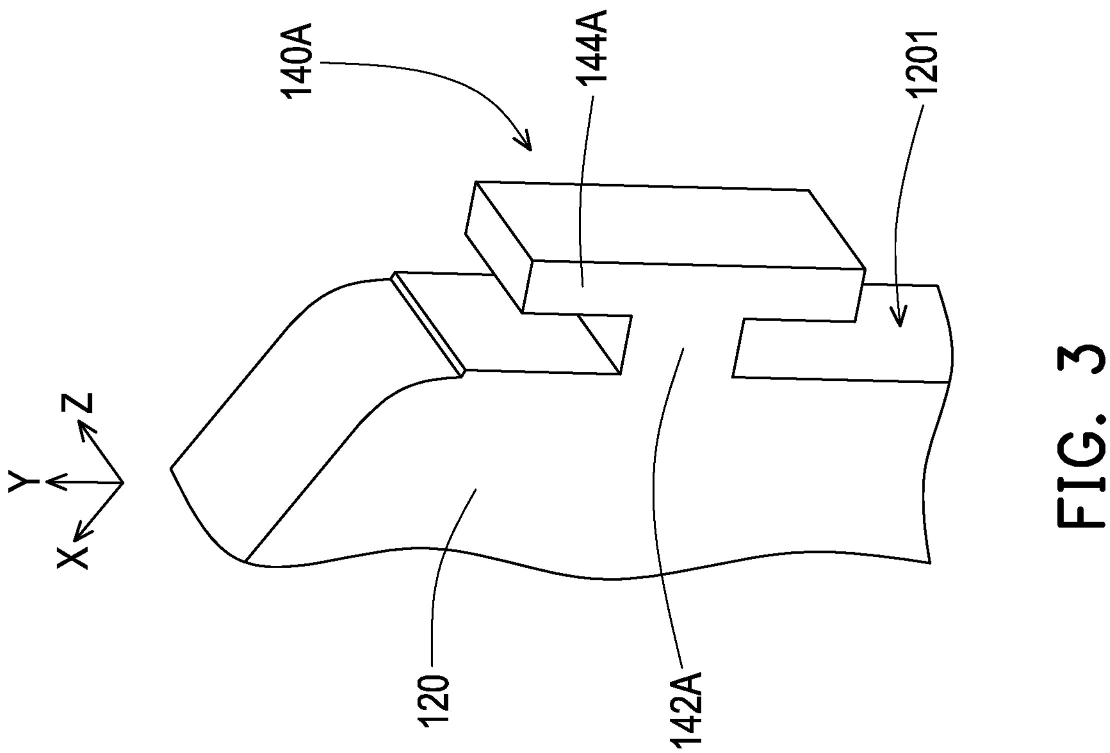
FIG. 3 is an enlarged view of a holding component and a detachable structure in FIG. 2.

FIG. 3 is an enlarged view of a holding component and a detachable structure in FIG. 2. Please refer to FIG. 3. In more detail, the detachable structure 140A of this embodiment has a connecting part 142A and a limiting part 144A, the connecting part 142A is connected between the holding component 120 and the limiting part 144A, and the limiting part 144A faces the base 110 and is configured to abut against the base 110 to limit the position of the holding component 120 relative to the base 110 along the second axial direction X as described above. In this embodiment, an outer diameter of the connecting part 142A is smaller than an outer diameter of the limiting part 144A, so that the detachable structure 140A is in a T-shaped form. Accordingly, the detachable structure 140A has a small structural strength at the connecting part 142A, so that the detachable structure 140A is easily broken at the connecting part 142A by a force exerted by the user, and the detachable structure 140A may be removed accordingly.

The disclosure does not limit the form of the detachable structure, which is illustrated below through the drawings.

Figure 4:
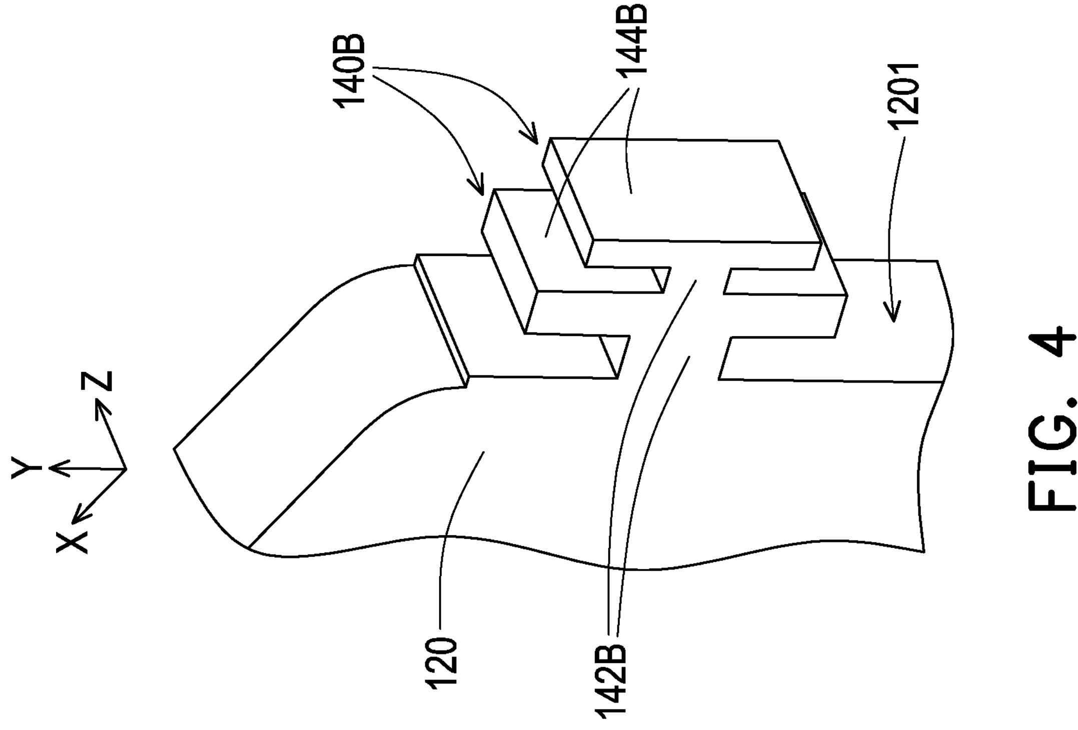
FIG. 4 is an enlarged view of a holding component and a detachable structure according to another embodiment of the disclosure.

FIG. 4 is an enlarged view of a holding component and a detachable structure according to another embodiment of the disclosure. A connecting part 142B and a limiting part 144B of each detachable structure 140B in FIG. 4 are similar to the connecting part 142A and the limiting part 144A of each detachable structure 140A in FIG. 3. The difference between the embodiment shown in FIG. 4 and the embodiment shown in FIG. 3 is that the multiple detachable structures 140B in FIG. 4 are connected sequentially along a direction from the holding component 120 to the base 110 (illustrated in FIG. 2) which allows the user to choose to remove all the detachable structures 140B or part of the detachable structures 140B, or to keep all the detachable structures 140B according to the needs of the degree of adjustment.

Figure 5:
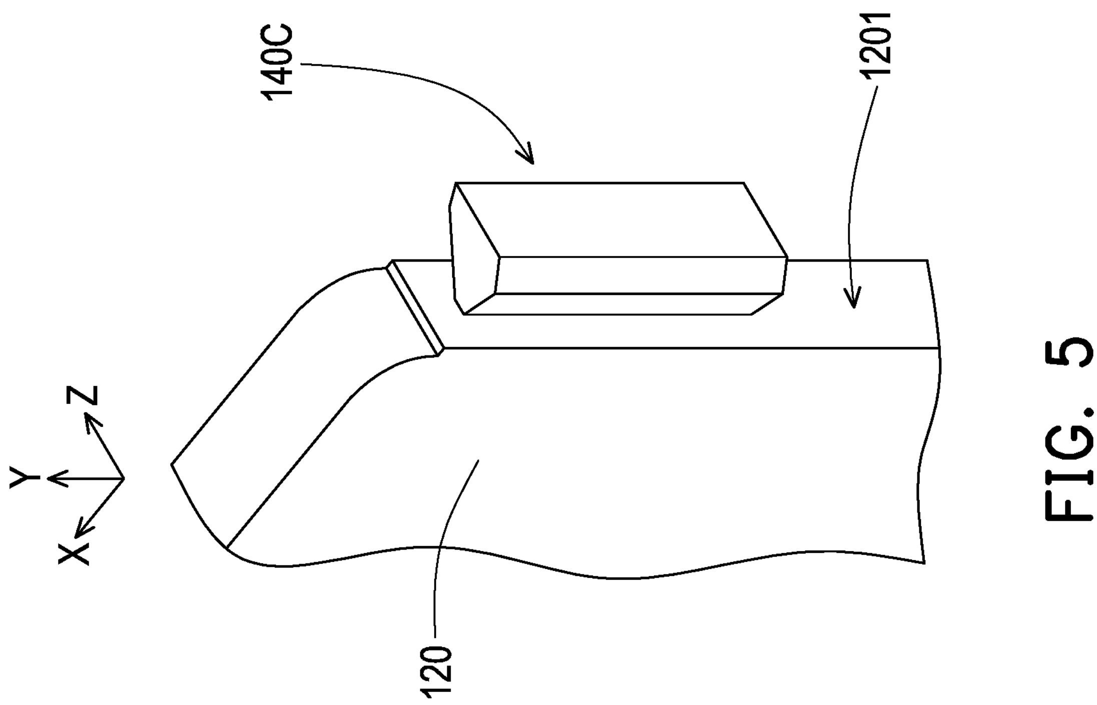
FIG. 5 is an enlarged view of a holding component and a detachable structure according to another embodiment of the disclosure.

FIG. 5 is an enlarged view of a holding component and a detachable structure according to another embodiment of the disclosure. The difference between the embodiment shown in FIG. 5 and the previous embodiments is that an outer diameter of a detachable structure 140C in FIG. 5 gradually increases from the holding component 120 to the base 110 (illustrated in FIG. 2). Accordingly, the detachable structure 140C has a small structural strength at a part connected to the holding component 120, so that the detachable structure 140C is easily broken at the part connected to the holding component 120 by the force exerted by the user, and the detachable structure 140C may be removed accordingly.

Figure 6:
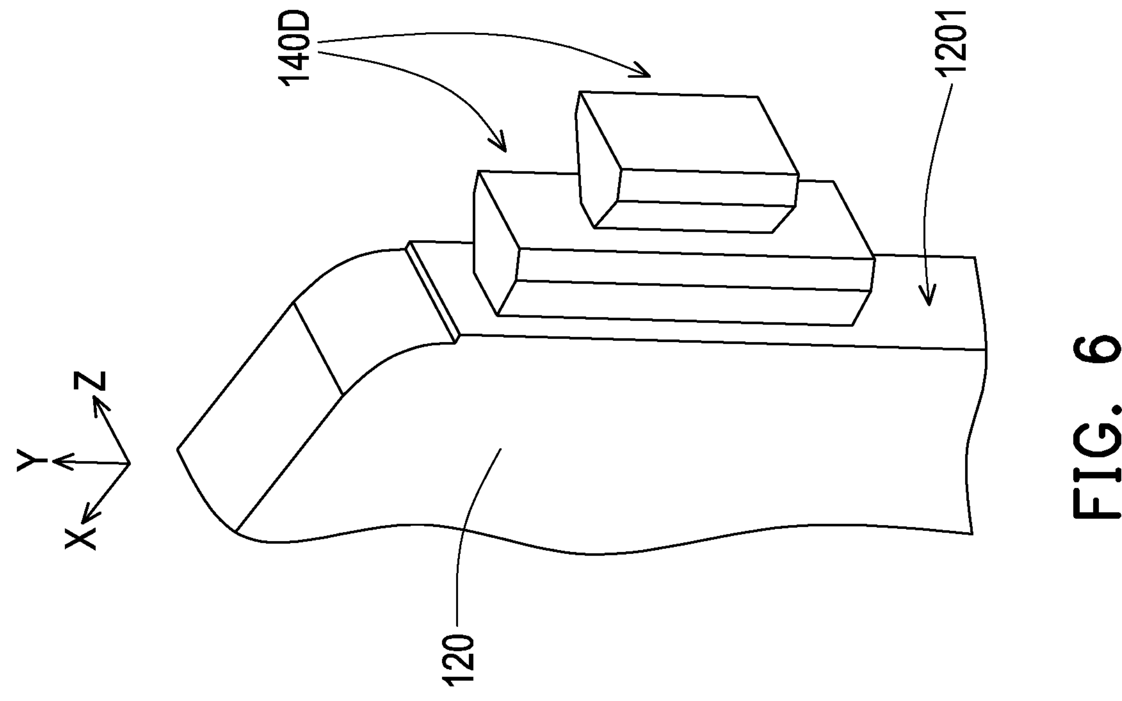
FIG. 6 is an enlarged view of a holding component and a detachable structure according to another embodiment of the disclosure.

FIG. 6 is an enlarged view of a holding component and a detachable structure according to another embodiment of the disclosure. Each detachable structure 140D of FIG. 6 is similar to each detachable structure 140C in FIG. 5. The difference between the embodiment shown in FIG. 6 and the embodiment shown in FIG. 5 is that multiple detachable structures 140D in FIG. 6 are connected sequentially along a direction from the holding component 120 to the base 110 (illustrated in FIG. 2) which allows the user to choose to remove all the detachable structures 140D or part of the detachable structures 140D, or to keep all the detachable structures 140D according to the needs of the degree of adjustment.

Figure 7:
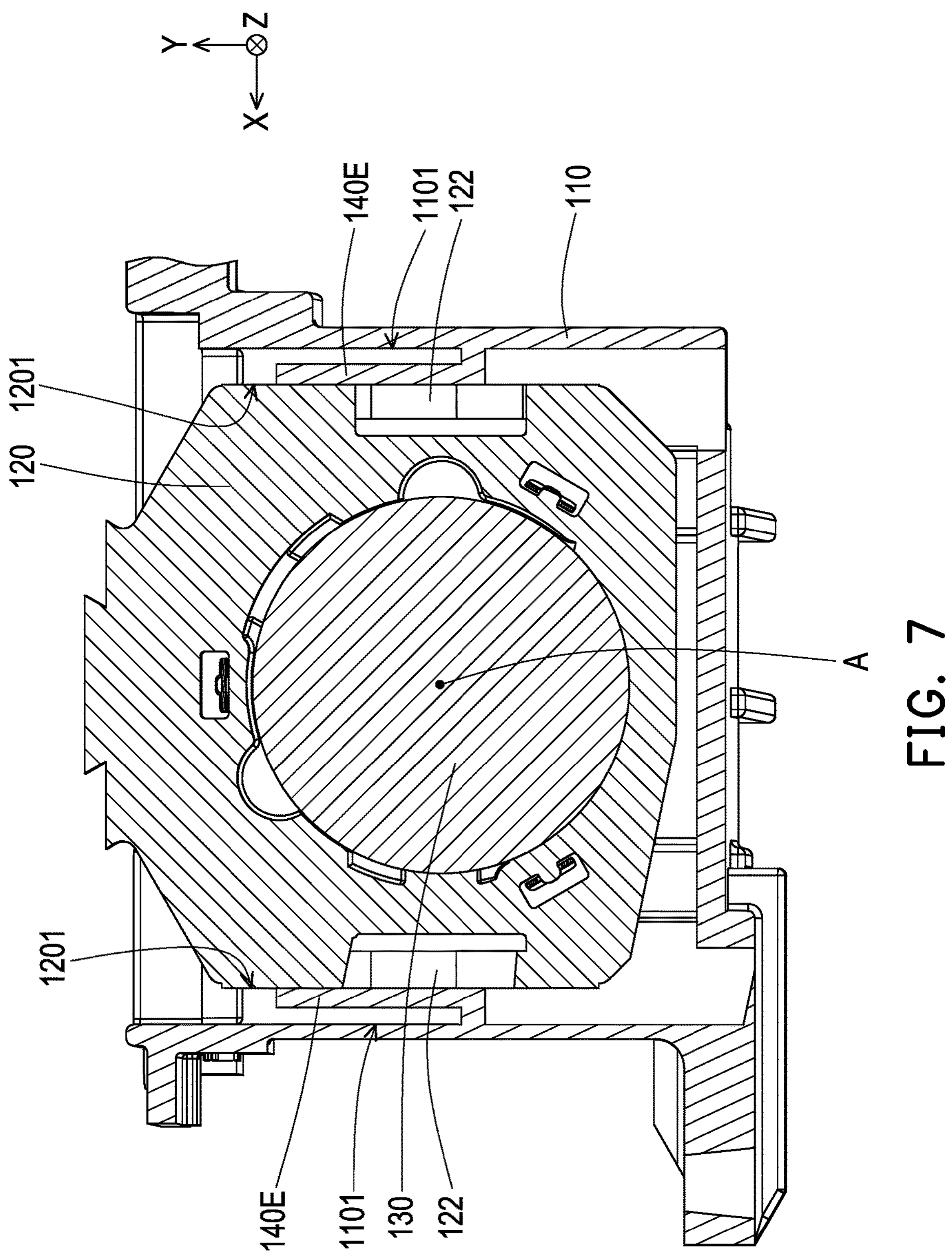
FIG. 7 is a cross-sectional view of an optical module according to another embodiment of the disclosure.
Figure 8:
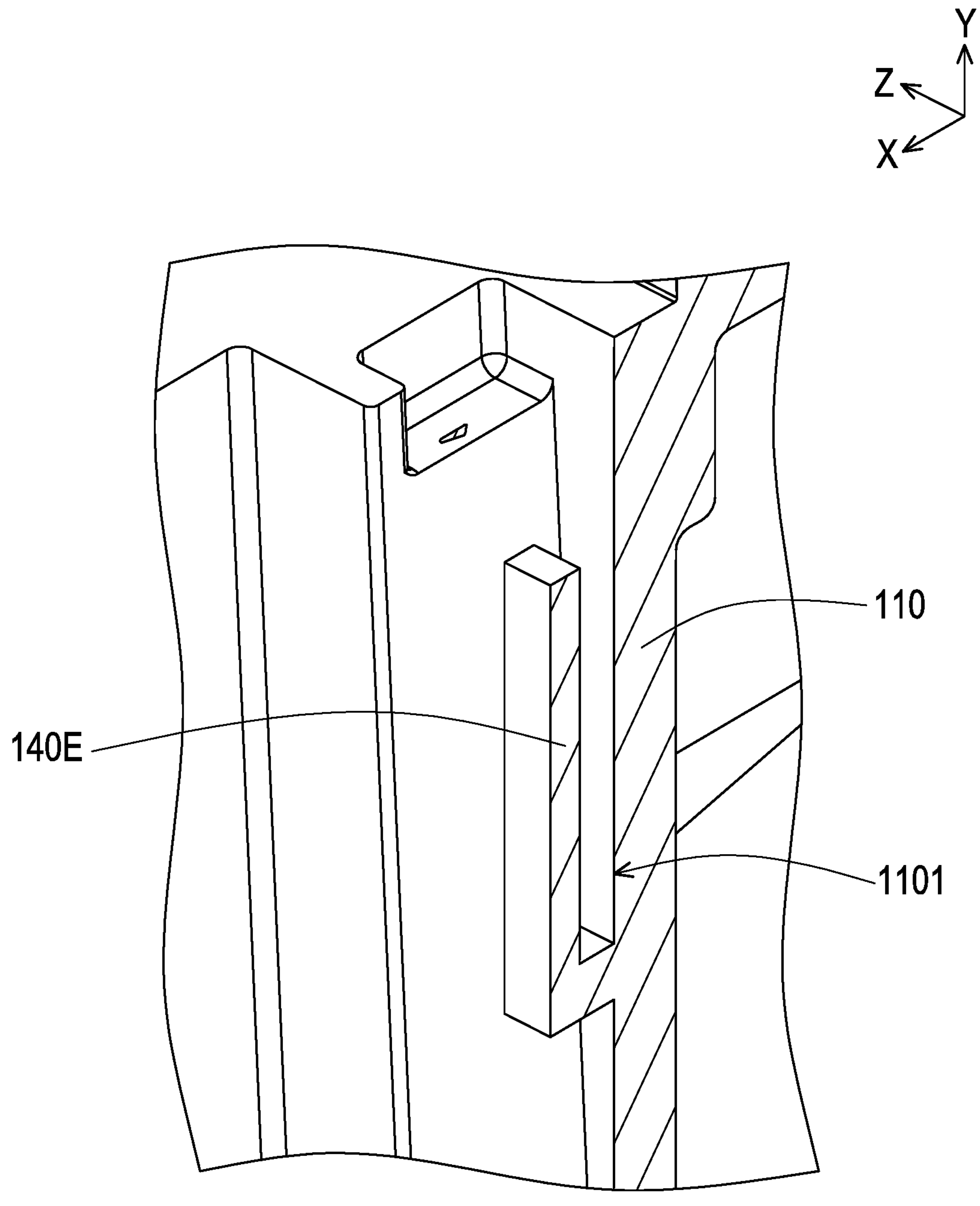
FIG. 8 is a perspective view of a partial structure of the optical module in FIG. 7.

FIG. 7 is a cross-sectional view of an optical module according to another embodiment of the disclosure. FIG. 8 is a perspective view of a partial structure of the optical module in FIG. 7. The difference between the embodiment shown in FIG. 7 and FIG. 8 and the previous embodiment is that a detachable structure 140E in FIG. 7 and FIG. 8 is extended from the inner walls 1101 of the base 110 to face and abut against the lateral surface 1201 of the holding component 120 to limit the position of the holding component 120 relative to the base 110 along the second axial direction X. The detachable structure 140E is, for example, in an L-shaped form. However, the disclosure is not limited thereto, and the detachable structure 140E may be in the form of the detachable structures 140A to 140D shown in FIG. 3 to FIG. 6, or in other suitable forms.

Figure 9:
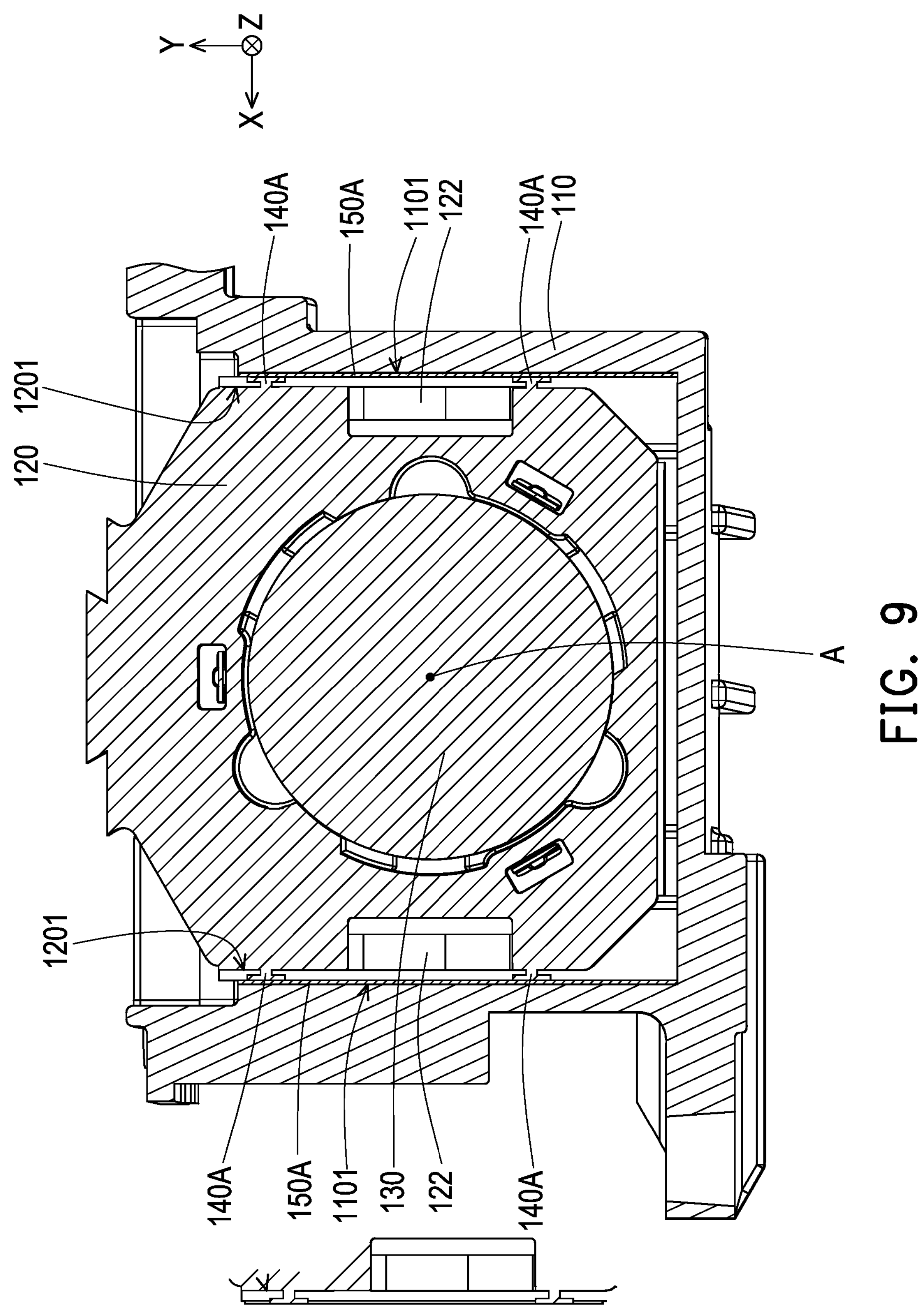
FIG. 9 is a cross-sectional view of an optical module according to another embodiment of the disclosure.

FIG. 9 is a cross-sectional view of an optical module according to another embodiment of the disclosure. The difference between the embodiment shown in FIG. 9 and the embodiment shown in FIG. 2 is that the optical module in FIG. 9 further includes at least one gasket (illustrated as two gaskets 150A), and the gasket 150A is detachably disposed between the base 110 and the detachable structures 140A. The function of the gasket 150A is similar to the function of the detachable structure 140A, and is configured to limit the position of the holding component 120 relative to the base 110 along the second axial direction X. The user may choose to remove the detachable structure 140A and the gasket 150A, or only to remove the gasket 150A, or only to remove the detachable structure 140A, or to keep all the detachable structures 140A and the gasket 150A according to the needs of the degree of adjustment.

Figure 10:
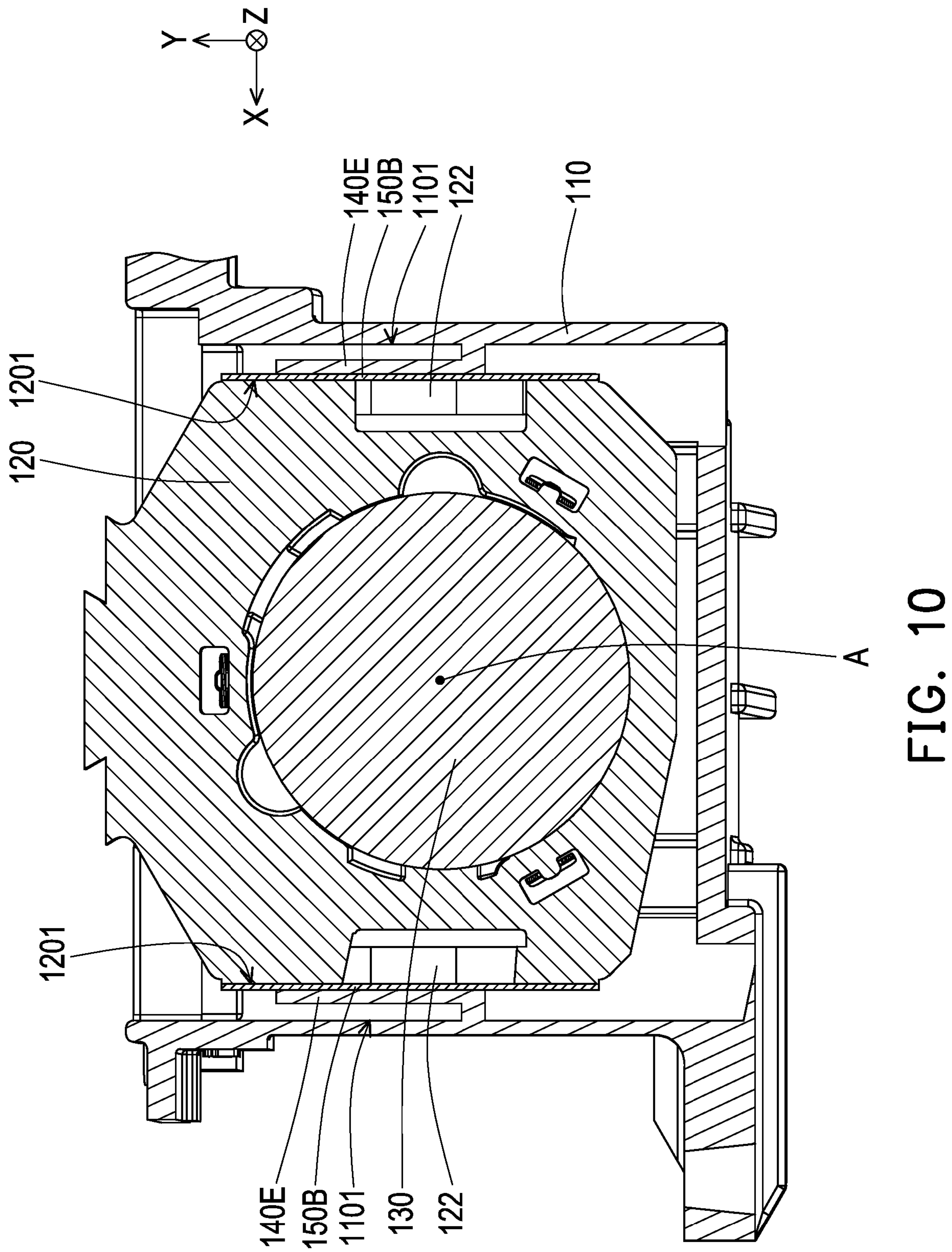
FIG. 10 is a cross-sectional view of an optical module according to another embodiment of the disclosure.

FIG. 10 is a cross-sectional view of an optical module according to another embodiment of the disclosure. The difference between the embodiment shown in FIG. 10 and the embodiment shown in FIG. 7 is that the optical module in FIG. 10 further includes at least one gasket (shown as two gaskets 150B), and the gasket 150B is detachably configured between the holding component 120 and between the detachable structures 140E. The function of the gasket 150B is similar to the function of the detachable structure 140E, and is configured to limit the position of the holding component 120 relative to the base 110 along the second axial direction X. The user may choose to remove the detachable structure 140E and the gasket 150B, or only to remove the gasket 150B, or only to remove the detachable structure 140E, or to keep all the detachable structures 140E and the gasket 150B according to the needs of the degree of adjustment.

In summary, in the optical module of the disclosure, the detachable structure is added to the holding component or the base and the gasket may further be added to limit the position of the holding component along the second axial direction, so that the position of the holding component and the optical element held thereon may be quickly and correctly adjusted along the first axial direction during the assembly process. If it is found during the assembly process that only the one-dimensional adjustment of the holding component along a single axial direction (i.e., the first axial direction) is not sufficient to adjust the optical path correctly, then the detachable structure and/or the gasket may be dismantled and the two-dimensional adjustment may be performed on the holding component along the two axial directions (i.e., the first axial direction and the second axial direction), so as to correctly adjust the optical path. Accordingly, the optical module of the disclosure can quickly and correctly perform the adjustment of the position of the optical element in response to different adjustment needs.

What is claimed is:

1. An optical module, comprising:
- a base;
- a holding component disposed on the base, wherein a position of the holding component relative to the base along a first axial direction is adjustable;
- an optical element disposed on the holding component; and
- at least one detachable structure extended from one of the base and the holding component to face another one of the base and the holding component, so as to limit a position of the holding component relative to the base along a second axial direction,
- wherein the base has two opposite inner walls, the holding component has two opposite lateral surfaces, the two lateral surfaces face the two inner walls respectively, and the at least one detachable structure is positioned between at least one of the inner walls and at least one of the lateral surfaces,
- wherein the at least one detachable structure is extended from the at least one inner wall to face the at least one lateral surface.

2. The optical module according to claim 1, wherein the first axial direction is perpendicular to the second axial direction.

3. The optical module according to claim 1, wherein the first axial direction and the second axial direction are perpendicular to an optical axis of the optical element.

4. The optical module according to claim 1, wherein a quantity of the at least one detachable structure is plural, a part of these detachable structures is positioned between one of the lateral surfaces and a corresponding inner wall, and another part of these detachable structures is positioned between another one of the lateral surfaces and a corresponding inner wall.

5. The optical module according to claim 1, wherein the at least one detachable structure has a connecting part and a limiting part, the connecting part is connected between one of the base and the holding component and the limiting part, and the limiting part faces another one of the base and the holding component.

6. The optical module according to claim 5, wherein an outer diameter of the connecting part is smaller than an outer diameter of the limiting part.

7. The optical module according to claim 1, wherein a quantity of the at least one detachable structure is plural, and these detachable structures are connected sequentially along a direction from one of the base and the holding component to another one of the base and the holding component.

8. The optical module according to claim 1, wherein the at least one detachable structure is in a T-shaped form.

9. The optical module according to claim 1, wherein an outer diameter of the at least one detachable structure gradually increases from one of the base and the holding component to another one of the base and the holding component.

10. The optical module according to claim 1, wherein the at least one detachable structure is in an L-shaped form.

11. The optical module according to claim 1, further comprising at least one gasket, wherein the at least one gasket is detachably disposed between one of the base and the holding component and the at least one detachable structure.

* * * * *